UNITED STATES PATENT OFFICE.

HENRY HEIDE AND CHARLES WIRTZ, OF NEW YORK, N. Y.

IMPROVEMENT IN PRESERVE COMPOSITIONS FOR MACAROONS.

Specification forming part of Letters Patent No. 170,368, dated November 23, 1875; application filed January 29, 1875.

*To all whom it may concern:*

Be it known that we, HENRY HEIDE and CHARLES WIRTZ, both of the city, county, and State of New York, have invented a new and Improved Preserve Composition for Macaroons, of which the following is a specification:

This invention has for its object to produce a composition from which bakers and confectioners may readily and with little labor make macaroons or other cakes, it being our intention to manufacture the composition, and supply it to those desirous of baking it.

At present every baker and confectioner, if he wishes to make almond-cake, (known as macaroons,) must grate the almonds, and mix the mass in his own shop. By producing a preserve composition which may be bought in suitable quantities, and kept for a convenient length of time, we can, in one place, and with one machine, do the work of all the single bakers, thus saving their time and labor, and producing for their use the mixture at less expense.

Our invention consists in compounding the following ingredients, in about the proportions set forth, to wit: Almonds, five parts, by weight; albumen of egg, one-half part, by weight; sugar, ten parts, by weight; water, two parts, by weight.

The almonds are first grated, and the albumen is then dissolved, without the sugar, in the water. The grated almonds and the dry sugar are now added, and the whole mass subjected to a reducing or grating apparatus, which makes the mixture more intimate, and reduces the almonds to a still finer degree.

This mixture is put in jars or cans that are closed air-tight, and can be preserved for a suitable length of time. The person using it will have to add two more parts of water, then shape, and finally bake, the mass. Suitable flavoring-essence may also be added. The addition of the albumen (which is known in market as dried white of egg) is the distinguishing feature of our invention.

The preserve mixture may, if desired, have the water evaporated from it, to be still easier preserved, and to occupy less room in transportation. In that case the baker will have to add four parts of water.

The proportion of sugar may be varied—the less sugar the better the mass; the more, the better it keeps.

We claim as our invention—

The preserve composition for macaroons, composed of almonds, dried white of egg, sugar, and water, in the proportions specified, the proportion of water being less than necessary for baking, substantially as set forth.

HENRY HEIDE.
CHARLES WIRTZ.

Witnesses:
A. V. BRIESEN,
E. C. WEBB.